United States Patent

Wada et al.

Patent Number: 6,114,675
Date of Patent: Sep. 5, 2000

[54] ALLOYING SYSTEM AND HEATING CONTROL DEVICE FOR HIGH GRADE GALVANIZED STEEL SHEET

[75] Inventors: Kozo Wada; Etsurou Hirai; Kazuya Tsurusaki; Yuuji Asahara, all of Hiroshima; Kwang-Hee Han; Jae-Young Lee, both of Tokyo, all of Japan; Noi-Ha Cho, Kwangyang, Rep. of Korea; Jang-Sub Shim, Kwangyang, Rep. of Korea; Si-Youl Chun, Kwangyang, Rep. of Korea

[73] Assignee: Mitsubishi Heavy Industries, Ltd., Tokyo, Japan

[21] Appl. No.: 09/201,709

[22] Filed: Dec. 1, 1998

[30] Foreign Application Priority Data

Dec. 5, 1997 [JP] Japan ................................ 9-335231

[51] Int. Cl.⁷ ........................................... H05B 6/10
[52] U.S. Cl. ........................ 219/645; 219/635; 219/650; 373/145; 118/620
[58] Field of Search ..................... 373/147, 148, 373/145, 149, 150; 219/660, 663, 665, 666, 667, 645, 635; 118/58, 620, 641, 429

[56] References Cited

U.S. PATENT DOCUMENTS

| | | | |
|---|---|---|---|
| 3,035,143 | 5/1962 | Leatherman | 219/667 |
| 3,398,252 | 8/1968 | Bock et al. | 219/666 |
| 4,115,675 | 9/1978 | Narihara et al. | 219/667 |
| 4,307,276 | 12/1981 | Kurata et al. | 219/645 |
| 4,357,512 | 11/1982 | Nishimoto et al. | 219/667 |
| 4,668,851 | 5/1987 | Kuepper. | |
| 5,156,683 | 10/1992 | Ross | 118/620 |
| 5,250,776 | 10/1993 | Pfaffmann. | |
| 5,477,035 | 12/1995 | Matsumoto et al. | 219/635 |
| 5,573,613 | 11/1996 | Lunden. | |

FOREIGN PATENT DOCUMENTS

| | | |
|---|---|---|
| 0251333A | 1/1988 | European Pat. Off.. |
| 0619692A | 10/1994 | European Pat. Off.. |
| 4-228528 | 8/1992 | Japan. |
| 4-294091 | 10/1992 | Japan. |
| 5-320852 | 12/1993 | Japan. |
| 8199324A | 8/1996 | Japan. |
| 2091428A | 7/1982 | United Kingdom. |

OTHER PUBLICATIONS

Patent Abstracts of Japan, vol. 03, No. 049, Apr. 26, 1979 (JP 54–025542 A—Feb. 26, 1979).

Primary Examiner—Tu Ba Hoang

[57] ABSTRACT

An alloying system for a galvanized steel sheet, using an induction heating coil, wherein the temperature of the steel sheet in an induction heating furnace is measured based on the impedance of a high frequency heater, and the amount of heating is controlled by feedback, to form an alloy layer of the steel sheet.

3 Claims, 4 Drawing Sheets

FIG.3 PRIOR ART
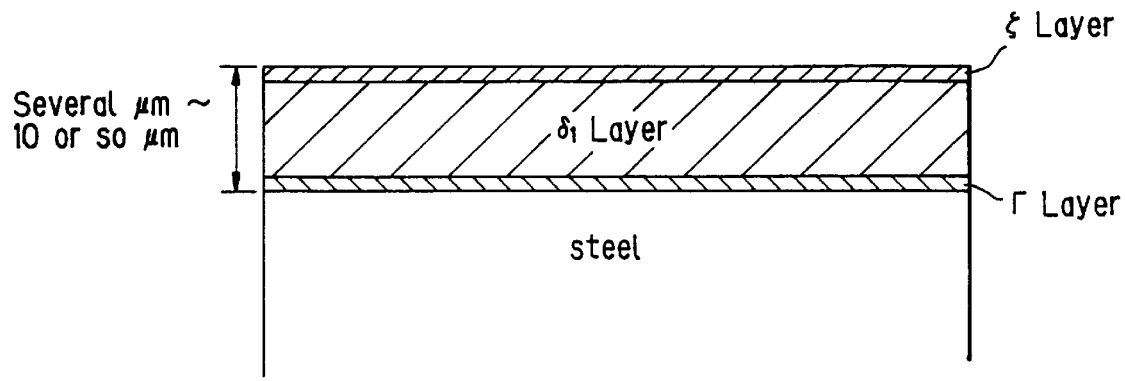
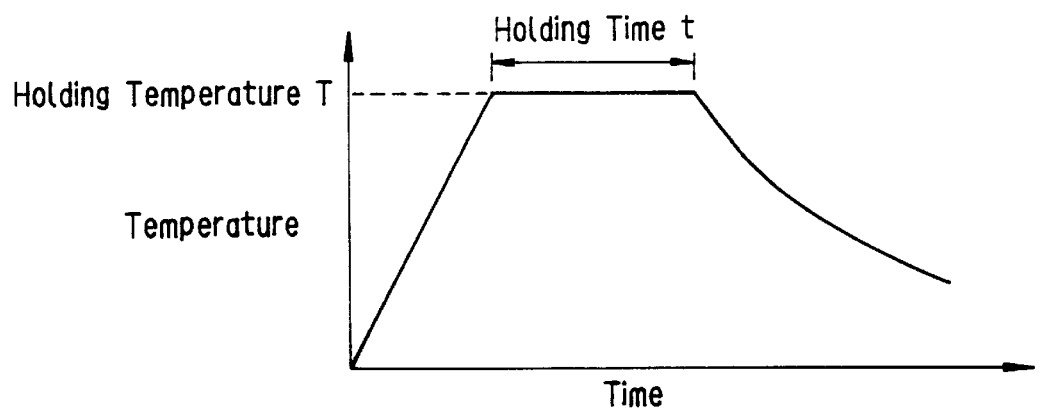
FIG.4 (a) Heat Cycle for Alloying of Zinc Coating Layer
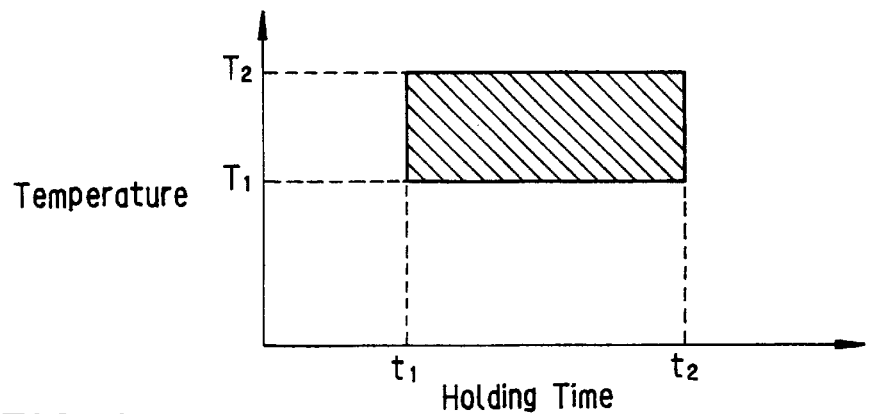
FIG.4 (b) Concept View of Suitable Conditions for Heating

ALLOYING SYSTEM AND HEATING CONTROL DEVICE FOR HIGH GRADE GALVANIZED STEEL SHEET

FIELD OF THE INVENTION

The present invention relates to an alloying system and a heating control system for a high grade galvanized steel sheet. More particularly, the invention relates to an alloying treatment system for a galvanized steel sheet, especially to a system useful when used to control the amount of heating in induction heating for alloy layer formation of a galvanized steel sheet.

BACKGROUND OF THE INVENTION

A continuous alloying treatment furnace for a hot dip zinc coated steel sheet is provided above a zinc pot 2 which applies galvanization to a steel sheet 1, as shown in FIG. 2. That is, above the zinc pot 2, a wiping nozzle 3, a heating furnace 4, a holding furnace 5, and a cooling zone 6 are disposed upward in this order. The steel sheet 1, passing through the zinc pot 2, has its surfaces coated with zinc. After the steel sheet 1 is controlled by the wiping nozzle 3 to have a predetermined weight of coating, it is passed through the alloying treatment furnace comprising the heating furnace 4, holding furnace 5, and cooling zone 6. During this process, alloying of the coated layer is performed.

Such a galvanized steel sheet, which has been subjected to alloying treatment, is better in weldability, workability, paintability, and corrosion resistance than an ordinary galvanized steel sheet. Thus, it is used frequently as a steel sheet for household electrical appliances and automobiles.

Alloying treatment of the zinc coating needs to be performed to obtain an iron-zinc alloy layer composition which is ideal, particularly, for ensuring both coating adhesion and press formability at the same time. Coating adhesion and press formability are important quality factors, because the former characteristic prevents powdery peeling of the coated layer, called powdering, during working, while the latter results in an alloy layer with a low sliding resistance, thereby reducing a load during forming. Specifically, the surface of the steel sheet after alloying treatment should have a coating composition consisting mainly of a $\delta_1$ phase while minimizing a $\zeta$ phase with a high sliding resistance, and a hard, brittle $\Gamma$ phase which deteriorates powdering resistance, as shown in FIG. 3.

The constitution of the alloy layer is determined by a heat cycle of heating, holding, and cooling, which have to fulfill the following requirements as shown in FIG. 4:

(1) Heating: Rapid heating for suppressing the $\zeta$ phase.

(2) Holding: Control of the holding temperature and holding time such that the minimum temperature is $T_1$ or higher, and the holding time is $t_1$ or longer, for suppression of the $\zeta$ phase, and that the maximum temperature is $T_2$ or lower, and the holding time is $t_2$ or shorter, for suppression of the $\Gamma$ phase.

(3) Cooling: Rapid cooling for suppressing the $\zeta$ phase.

It is well known that induction heating is suitable as means of obtaining rapid heating and a highly accurate heating temperature (=holding temperature) among the above requirements. Various induction heaters for alloying have been proposed (e.g., Japanese Unexamined Patent Publication Nos. 294091/92, 228528/92 and 320852/93). Thus, an induction heating type heating furnace is used as one of means for obtaining a heat cycle for forming an alloy layer of a galvanized steel sheet.

FIG. 5 shows an example of circuit configuration of an induction heating apparatus.

A material 8 to be heated is passed through a solenoid coil 7, and a high frequency current of a frequency from several kHz to 100 kHz is applied to the solenoid coil to flow eddy currents into the material 8, thereby heating the material 8. The generated heat distribution and the temperature distribution, in the width direction, of the material 8 to be heated by induction heating vary with the type and width of the material 8 as well as the frequency of induction heating. The oscillation frequency of the source of induction heating is nearly in synchronism with the frequency of the heating coil and the capacitor as a resonance circuit. Thus, the frequency of the high frequency current flowing in the heating coil is determined by the capacity of the resonating capacitor and the inductance of the solenoid coil. The inductance of the solenoid coil is determined by its shape and number of turns.

On the other hand, the appropriate holding temperature $T_2$–$T_1$ and the appropriate holding time $t_2$–$t_1$ vary with the weight of coating, and also vary with the type of steel of the steel sheet. To obtain the amount of heating, the heating temperature, and the holding temperature that are highly accurate, it is necessary to measure the temperature of the steel sheet with high accuracy.

With the conventional alloying apparatus, a temperature gauge 9 is mounted between the heating furnace 4 and the holding furnace 5, as shown in FIG. 2, to measure the temperature of the steel sheet that has passed through the heating furnace. This is intended to obtain appropriate temperature conditions. Based on the measured temperature of the steel sheet, the amount of heating is adjusted so that an appropriate temperature will be obtained. Furthermore, the alloy layer of the steel sheet on the exit side of the cooling zone 6 shown in FIG. 2 is measured with an alloying degree meter 10. Based on the results of measurement, the amount of heating is adjusted so that an appropriate alloy layer will be obtained.

To measure the temperature of a steel sheet, the conventional alloying apparatus used a radiation thermometer or the like as the temperature gauge 9 of FIG. 2. However, a radiation thermometer cannot measure the temperature accurately, because, at the exit side of the heating (alloying) furnace 4, the surface of the steel sheet is white to silver in color, and not black. This makes it difficult to obtain a highly accurate heating temperature, posing difficulty in forming an appropriate alloy layer. The state of alloying is measured with the alloying degree meter 10 after cooling. However, the alloying degree meter 10 is apart from the heating furnace 4, so that a delay occurs even upon feedback control. As a result, a galvanized steel sheet may be produced at an inappropriate heating temperature. With a zinc coating alloying apparatus, therefore, it is necessary to measure the temperature at the heating furnace 4, and control the amount of heating based on the measured temperature.

SUMMARY OF THE INVENTION

The present invention has been accomplished in the light of the above-described problems. An object of the invention is to provide an alloying treatment system, etc. for a galvanized steel sheet, equipped with means by which the steel sheet temperature of a heating furnace can be accurately grasped to supply an appropriate heating temperature necessary for the formation of an alloy layer of the galvanized steel sheet by use of an induction heater.

To attain the above object, the constitution of the present invention is characterized by:

1) Involving a method which measures impedance on a load side as viewed from a high frequency power source to calculate the resistivity of a material to be heated, and which, based on the values of the relevant properties, detects the accurate temperature of the material to be heated.

2) Involving a heating temperature control method which measures the impedance on the load side as viewed from the high frequency power source to calculate the resistivity of the material to be heated, thereby making it possible, based on the values of the relevant properties, to detect the accurate temperature of the material to be heated, and to obtain an appropriate temperature.

BRIEF DESCRIPTION OF THE DRAWINGS

The present invention will become more fully understood from the detailed description given hereinbelow and the accompanying drawings, which are given by way of illustration only, and thus are not limitative of the present invention, and wherein:

FIG. 3 is an explanation drawing showing a surface structure of a galvanized steel sheet after alloying treatment;

FIGS. 4(a) and 4(b) are characteristics graphs showing the range of suitable conditions for a heat cycle in alloying treatment;

PREFERRED EMBODIMENTS OF THE INVENTION

Figure 2:
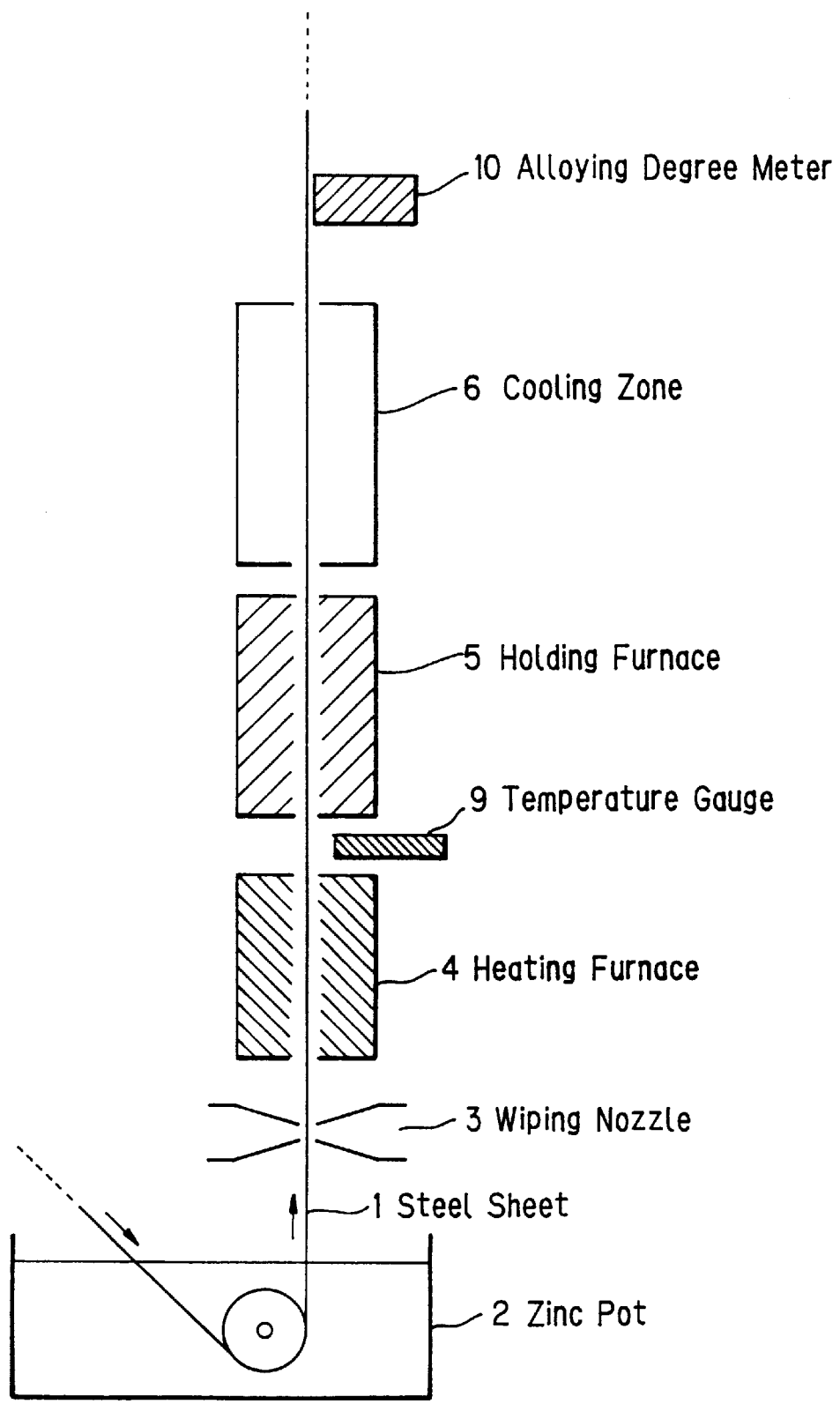
FIG. 2 is an explanation drawing conceptually showing a continuous alloying apparatus for a galvanized steel sheet according to an earlier technology.

As shown in FIG. 2, a conventional zinc coating alloying apparatus used a radiation thermometer or the like as the temperature gauge 9. Because of its characteristics, the radiation thermometer was not able to measure the accurate temperature, when the color of the surface to be measured was other than black in color. Thus, it was difficult to set an appropriate heating temperature necessary for alloying.

Figure 1:
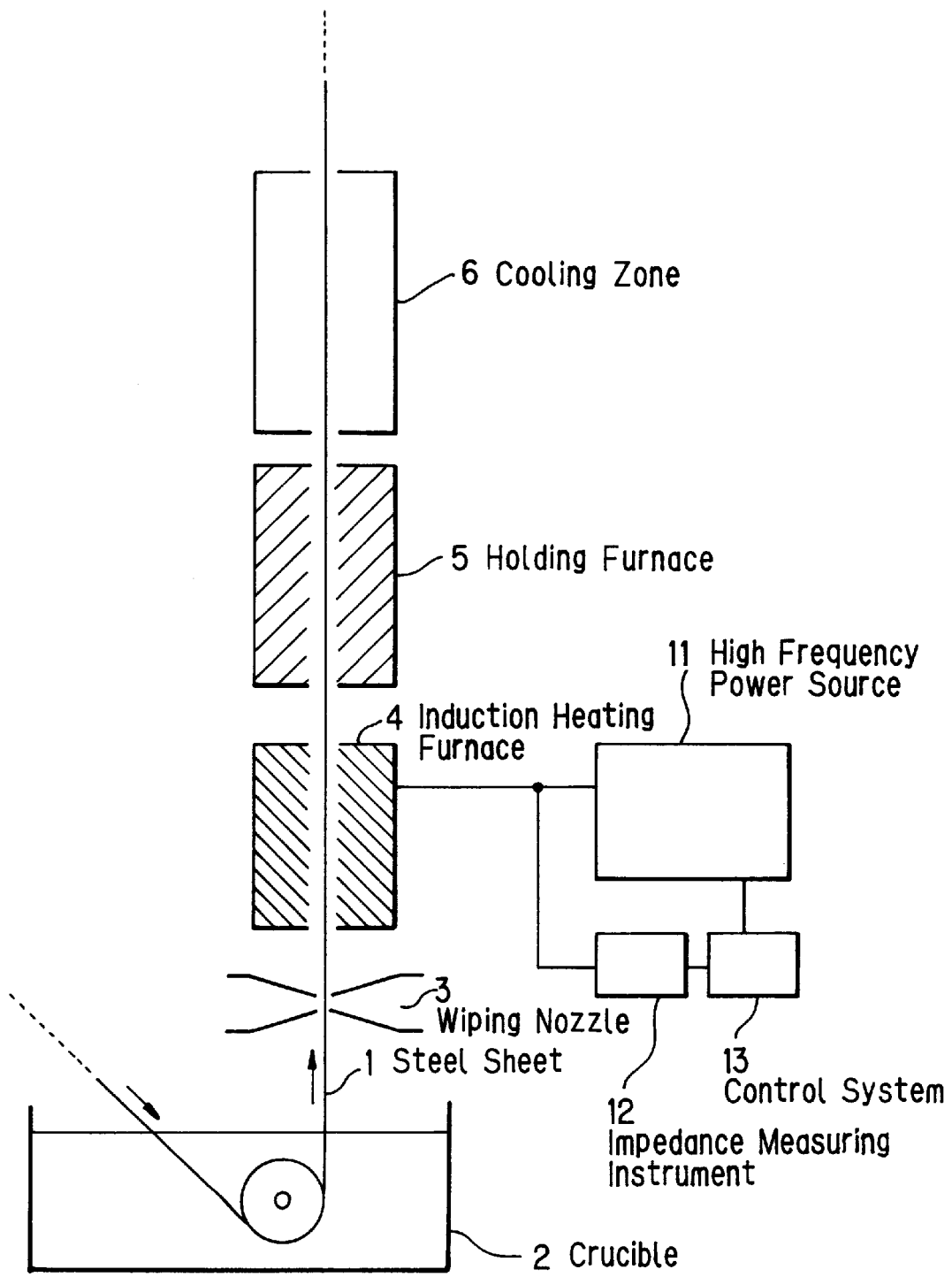
FIG. 1 is a constitution drawing of a system according to a first embodiment of the present invention.

The present invention, on the other hand, adopts a control method which measures impedance on a load side as viewed from a high frequency power source 11, calculates the temperature of a steel sheet based on the value of the impedance, and adjusts the amount of heating, as illustrated in FIG. 1.

Figure 5:
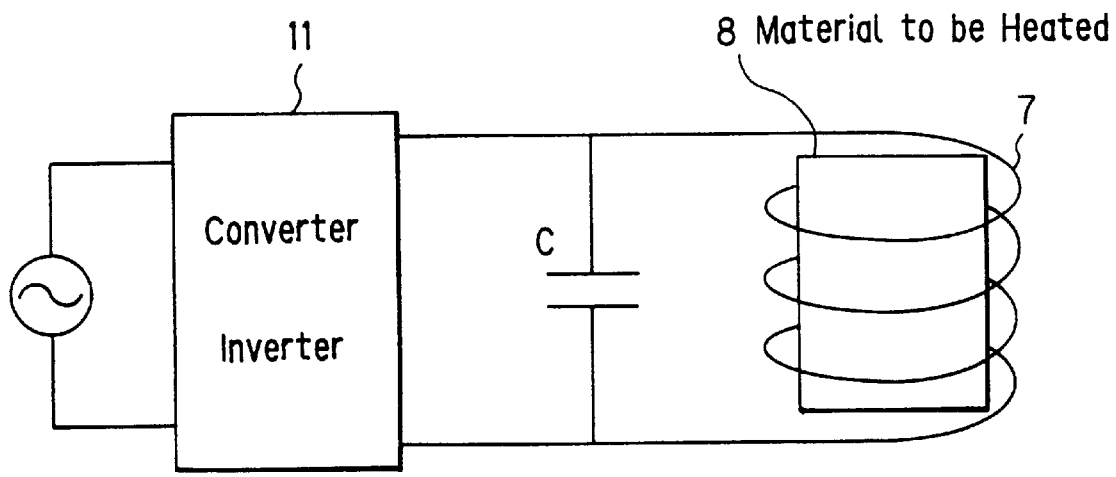
FIG. 5 is a constitution/circuit diagram showing an induction heater according to an earlier technology.
Figure 6:
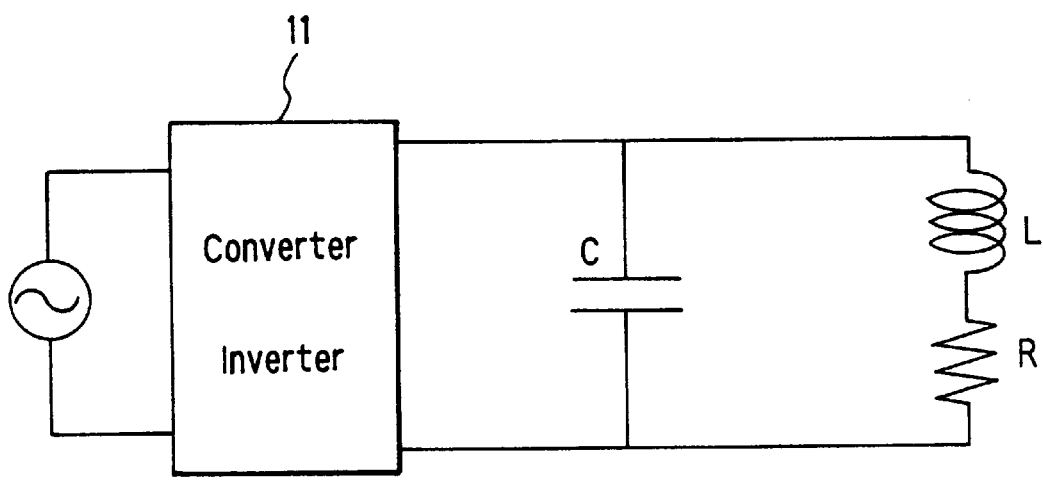
FIG. 6 is an equivalent circuit diagram of a constitution showing an induction heater according to the present invention.

The constitution of an apparatus for induction heating in a heating furnace is shown in FIG. 5, and this apparatus can be replaced by an equivalent circuit as shown in FIG. 6. The impedance of a load, as viewed from a power source output side in FIG. 6, is given by the equation (1):

$$Z \cong \frac{L}{CR} \quad (1)$$

where Z is the impedance of the load, L is the inductance of the coil, and C is the capacity of the capacitor. In this equation, the resistance R can be divided into a resistance component $R_c$ of the coil, and a resistance component $R_w$ of the material to be heated, and can be expressed as in the equation (2):

$$R = R_c + R_w \quad (2)$$

The resistance component $R_c$ of the coil, and the resistance component $R_w$ of the material to be heated are given by the equations (3) and (4) using the frequency f, the permeability $\mu$, the resistivity $\rho$, the number N of turns of the coil, the thickness $t_w$ of the steel sheet, and the cross sectional area $A_w$ of the steel sheet:

$$R_c = \sqrt{\pi f \mu_0 \rho_c}\, p_c N^2 \quad (3)$$

$$R_w = 2\pi f N^2 Q\!\left(\frac{t_w}{\delta_w}\right) A_w \quad (4)$$

where $\delta_w$ and Q are given by the equations (5) and (6) with $\omega$ denoting the circular frequency:

$$\delta_w = \sqrt{\frac{2\rho_w}{\omega \mu}} \quad (5)$$

$$Q\!\left(\frac{t_w}{\delta_w}\right) = \frac{1}{\frac{t_w}{\delta_w}} \frac{\sinh\!\left(\frac{t_w}{\delta_w}\right) - \sin\!\left(\frac{t_w}{\delta_w}\right)}{\cosh\!\left(\frac{t_w}{\delta_w}\right) + \cos\!\left(\frac{t_w}{\delta_w}\right)} \quad (6)$$

The equation (4) can be rewritten as the equation (7) using the proportionality factor $k_1$:

$$R_w = k_1 \sqrt{\mu_w \rho_w f} \quad (7)$$

The resistivity $\rho$ is a function of temperature. When the temperature of the material to be heated is raised by induction heating, the resistance of the material to be heated varies according to the equation (7). Thus, the impedance expressed by the equation (1) can be represented by the equation (8), using the proportionality factor $k_2$, as a function of the temperature T of the material to be heated:

$$Z = k_2 F(T) \quad (8)$$

From the equation (8), the temperature of the steel sheet in the heating furnace can be grasped by measuring the impedance on the load side as viewed from the high frequency power source 11. By controlling the electric power in the heating furnace based on the steel sheet temperature obtained from the equation (8), it becomes possible to constantly give an appropriate heating temperature for alloying.

EXAMPLE

A concrete example of the present invention will be illustrated with reference to FIG. 1. In this example, the invention is applied to a continuous alloying treatment furnace for a hot dip galvanized steel sheet.

Above a zinc pot 2, a wiping nozzle 3, a heating furnace 4, a holding furnace 5, and a cooling zone 6 are disposed upward in this order. A steel sheet 1 passing through the zinc pot 2 has its surfaces coated with zinc. After the steel sheet 1 is controlled by the wiping nozzle 3 to have a predetermined weight of coating, it is passed through an alloying treatment furnace comprising the heating furnace 4, holding furnace 5, and cooling zone 6. During this process, alloying of the coated layer is performed.

As the heating furnace 4, an induction heating type heating furnace as shown in FIG. 5, for instance, is used in order to achieve rapid heating or obtain a highly accurate heating temperature. To this induction heating furnace 4, a high frequency power source 11, an impedance measuring instrument 12, and a control system 13 are connected.

The high frequency power source 11 supplies an electric power to the induction heating furnace 4, and heats the steel sheet 1, the material to be heated, by eddy currents. The high frequency power source 11 is controlled by the control system 13.

The impedance measuring instrument 12 is a device for measuring the impedance on the load side as viewed from the high frequency power source 11. The so measured impedance and the temperature of the steel sheet 1, the material to be heated, are in the relationship of the aforementioned equation (8).

The control system 13 determines the temperature of the steel sheet 1 in accordance with the equation (8) on the basis of the measured impedance. Then, the control system 13 controls the high frequency power source 11 so that this temperature will become an appropriate heating temperature necessary for alloying.

In the present Example, as noted above, the steel sheet temperature in the heating furnace is measured from the impedance of the high frequency heater, and the amount of heating is controlled by feedback. Thus, the accurate temperature can be measured regardless of the color of the steel sheet 1. Based on this measurement, a highly accurate heating temperature can be set to facilitate the formation of an appropriate alloy layer.

The present Example shows the invention as applied to the continuous alloying treatment furnace for a hot dip galvanized steel sheet. However, this invention is not limited thereto. For instance, in a heating apparatus using an induction heating coil, the temperature of a material to be heated can be measured according to the invention based on the impedance of a high frequency heater. As noted from this, the invention can be applied generally and widely.

As described in detail above based on the embodiments, a first aspect of the present invention provides the alloying system for a galvanized steel sheet, the alloying system using an induction heating coil, wherein the temperature of the steel sheet in a heating furnace is measured based on the impedance of a high frequency heater, and the amount of heating is controlled by feedback. Thus, the temperature of the steel sheet in the induction heating furnace can be measured highly accurately, so that a high quality galvanized steel sheet can be produced, and an alloying treatment system for a galvanized steel sheet can be realized.

A second aspect of the present invention provides the heating control device in a heating system using an induction heating coil, wherein the temperature of a material to be heated is measured based on the impedance of a high frequency heater. Thus, the temperature of the material to be heated can be measured with high accuracy. That is, the temperature of the steel sheet in the induction heating furnace can be measured with high accuracy, by measuring the impedance on the load side as viewed from the high frequency power source.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An alloying system for a galvanized steel sheet, comprising:
   a heating furnace that heats the galvanized steel sheet by a high frequency induction heating coil heater;
   an impedance measuring unit that calculates an impedance of the steel sheet being heated, said measured impedance being indicative of a temperature of the heated galvanized steel sheet; and
   a control unit that controls a temperature of said heating furnace based on said measured impedance.

2. A heating system for heating a material, comprising:
   a high frequency induction heating coil heater that heats the material;
   an impedance measuring unit that measures an impedance of the material being heated; and
   a heating control device that adjusts a temperature of the heated material by controlling said induction heating coil based on said measured impedance.

3. An alloying system for alloying a metal sheet, comprising:
   a hot dip galvanizing tank that galvanizes the metal sheet;
   an induction heating furnace unit that heats the galvanized metal sheet at a controlled temperature;
   a holding device that holds a temperature of the heated galvanized metal sheet at a predetermined temperature from a predetermined period of time; and
   a cooling zone that cools the heated galvanized metal sheet, wherein
   said induction heating furnace unit includes,
      an induction heating furnace that heats the galvanized metal sheet,
      a high frequency power source for generating heat in said induction heating furnace,
      an impedance measuring unit that measures at least an impedance of the heated galvanized metal sheet within said induction heating furnace, and
      a control unit that controls the temperature of heated galvanized metal sheet to said controlled temperature by controlling said high frequency power source based on said measured impedance.

* * * * *